(12) United States Patent
Seydnejad et al.

(10) Patent No.: US 6,697,187 B2
(45) Date of Patent: Feb. 24, 2004

(54) METHOD AND APPARATUS FOR RAMAN AMPLIFIER GAIN CONTROL

(75) Inventors: Saeid Seydnejad, Ottawa (CA); Zhuhong P. Zhang, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/873,389

(22) Filed: Jun. 5, 2001

(65) Prior Publication Data

US 2002/0181074 A1 Dec. 5, 2002

(51) Int. Cl.[7] ............................................... H01S 3/00
(52) U.S. Cl. ..................................................... 359/334
(58) Field of Search ............................... 372/3; 359/334

(56) References Cited

U.S. PATENT DOCUMENTS

| | | | |
|---|---|---|---|
| 6,292,288 B1 * | 9/2001 | Akasaka et al. | 359/334 |
| 6,344,922 B1 * | 2/2002 | Grubb et al. | 359/334 |
| 6,366,395 B1 * | 4/2002 | Drake et al. | 359/337 |
| 6,377,394 B1 * | 4/2002 | Drake et al. | 359/337.4 |
| 6,417,959 B1 * | 7/2002 | Bolshtyansky et al. | 359/334 |
| 6,441,950 B1 * | 8/2002 | Chen et al. | 359/334 |
| 6,452,715 B1 * | 9/2002 | Friedrich | 359/334 |
| 6,542,287 B1 * | 4/2003 | Ye et al. | |
| 2001/0040719 A1 * | 11/2001 | Okuno et al. | 359/334 |
| 2001/0050802 A1 * | 12/2001 | Namiki et al. | 359/337.11 |
| 2002/0167719 A1 * | 11/2002 | Pedersen et al. | 359/341.3 |

FOREIGN PATENT DOCUMENTS

| | | | | |
|---|---|---|---|---|
| JP | 2001230480 A | * | 8/2001 | G02F/1/35 |
| JP | WO 01/89045 A1 | * | 11/2001 | G02F/1/35 |

OTHER PUBLICATIONS

Becker et al. Erbium Doped Fiber Amplifiers Fundamentals and Technology. Academic Press. 1999. pp. 131–152.*

Namiki et al. Ultrabroad–band Raman Amplifiers Pumped and Gain–Equalized by Wavelength–Division–Multiplexed High–Power Laser Diodes. IEEE Journal on Selected Topics in Quantum Electronics. vol. 7. No. 1. Jan./Feb. 2001. pp. 3–16.*

Agrawal, Govind P. Fiber–Optic Communication Systems. John Wiley & Sons, Inc. 2nd Edition. pp. 379–385. 1997.*

Nortel Networks Technical Presentation "1.28 Tbit/s (32×40 Gbit/s) Transmission Over 1000km With Only 6 Spans", Y. Zhu et al. 2001.

Web Proforum Tutorial "Raman Amplification Design in Wavelength Division Multiplexing (WDM) Systems Tutorial", Apr. 25, 2001.

* cited by examiner

*Primary Examiner*—Thomas G. Black
*Assistant Examiner*—Deandra M. Hughes
(74) *Attorney, Agent, or Firm*—Max R. Wood; Ogilvy Renault

(57) ABSTRACT

In a method and apparatus for measuring and controlling signal gain of a backward Raman amplifier having multiple pump lasers as used in optical communications networks, Raman pump power levels required to provide a uniform gain across a range of wavelengths in an optical fiber are determined by a combination of theoretical calculations and empirical measurement. A system of non-linear differential equations is solved for various pump powers and used to build a look-up table relating desired average Raman gain to the normalized power required to provide a uniform gain across a range of wavelengths. The linear relationship between Raman pump power and average Raman gain is determined by measuring data signal power levels at specific Raman pump powers. A desired average Raman gain is first applied to the linear relationship to determine total power required, and then applied to the look-up table to determine the required relative pump powers.

11 Claims, 5 Drawing Sheets

Pre-Compute Look-up Table

METHOD AND APPARATUS FOR RAMAN AMPLIFIER GAIN CONTROL

CROSS-REFERENCE TO RELATED APPLICATIONS

This is the first application filed for the present invention.

MICROFICHE APPENDIX

Not Applicable.

TECHNICAL FIELD

The present invention relates to the field of optical transmission systems for telecommunications and, in particular, to a method and system for measuring a signal gain produced by Raman amplifiers connected to an optical link.

BACKGROUND OF THE INVENTION

Long distance data transmission in optical networks requires periodic amplification of the optical signals to compensate for attenuation due to the cumulative effects of absorption and scatter in optical fibers. One approach to optical amplification utilizes Raman optical amplifiers.

Raman amplifiers play an important role in optical communication systems because they permit longer fiber spans. They provide better signal amplification while introducing less noise than traditional signal amplifiers. The Raman amplifier compensates for fiber loss by providing signal gain in every span. It uses the non-linear scattering property of optical fiber known as Stimulated Raman Scattering (SRS) to transfer energy from pump lasers to signal channels.

Raman amplifiers can be configured as either forward Raman amplifiers or backward Raman amplifiers. Backward Raman amplifiers exhibit better performance and are used in long-haul optical networks. Backward Raman amplifiers are installed at the down stream end of an optical span fiber, amplifying the signals along the fiber. These amplifiers use the span fiber as a medium for amplification, hence they are called distributed Raman amplifiers.

The Raman effect causes light traveling within a medium, such as an optical fiber, to be amplified by the presence of shorter wavelength light traveling within the same medium. Energy is transferred from the shorter wavelength light to a longer wavelength signal. The gain spectrum of a silica fiber pumped by a monochromatic Raman pump exhibits maximum gain when the wavelength of the signal to be amplified is approximately 100 nm longer than the wavelength emitted by the Raman pump. Multiple Raman pump lasers at different wavelengths can be used to spread this influence over a wider range of longer wavelengths. Backward Raman amplifiers typically use two to four pump lasers to provide amplification for 40 to 80 signal channels.

One of the problems associated with such arrangements is the difficulty in achieving a uniform gain over a range of wavelengths. The relative powers required for each Raman pump changes as the mean gain of the Raman amplifier increases, due to the complex interactions resulting from stimulated Raman scattering between the various optical wavelengths in the fiber.

Effective use of a Raman amplifier in a communications network requires gain measurement and Raman pump control to obtain a desired gain. To control a multiple pump Raman amplifier, the gain should be mapped to individual pump powers. Calculating a theoretical relationship between Raman gain and relative pump powers requires solving a non-linear system of differential equations that describe optical signal propagation and the Raman scattering phenomenon in the fiber. However, there are too many variables and equations to be simultaneously solved. There are also practical issues to be considered such as connection losses, variations in fiber core size and attenuation, etc., to accurately or easily model this behavior.

There therefore exists a need for a mechanism that permits a network administrator to determine relative pump powers for a backward Raman amplifier in order to provide uniform gain over a range of optical signal channels used for data transfer through an optical network.

SUMMARY OF THE INVENTION

An object of the present invention is to provide a method for determining pump power values for a backward Raman amplifier in order to provide uniform gain across a range of optical signal channels. The method described here is not limited to achieve a uniform Raman gain profile and can be similarly used to provide any gain profile for Raman amplification. Two terminologies are distinguished hereinafter; "Raman gain" means the gain as a function of channel wavelength, and "average Raman gain" means the average of all gains obtained for each wavelength.

According to an aspect of the present invention, there is provided a method for determining a power setting for each of a plurality of Raman pumps of a Raman amplifier used to enhance signal propagation in a given fiber medium, the method comprising steps of: pre-computing table values for a look-up table, the table values representing, for each of a plurality of average Raman gain values, corresponding normalized power values for each Raman pump required to provide substantially uniform Raman gain across a plurality of signal wavelengths, by solving predetermined fiber propagation equations; determining a linear relationship between a total Raman pump power and an average Raman gain in the given fiber medium at the initialization of the Raman amplifier in the system; determining a required total Raman pump power to achieve a desired average Raman gain using the linear relationship; looking up a normalized power value in the look-up table corresponding to the desired average Raman gain for each Raman pump; and multiplying the normalized power value for each Raman pump by the required total Raman pump power to determine the power setting for the respective Raman pump.

In accordance with another aspect of the present invention, there is provided a Raman amplifier comprising: a plurality of Raman pumps respectively outputting a predetermined range of optical wavelengths; a controller for controlling a respective pump power for each of the Raman pumps, the controller being responsive to the input of a desired average Raman gain to compute the respective total pump power value, and using a look-up table that provides normalized pump powers for the respective Raman pumps to provide a uniform gain distribution (or any given gain distribution).

The present invention uses a combination of theoretical calculations and empirical measurements to provide a method for controlling a backward Raman amplifier in an optical communication network. The theoretical calculation is used to construct the look-up table which relates the average gain to normalized power values whereas the empirical measurement determines the relationship between the average Raman gain and the total Raman pump power.

It has been shown that there is a linear relationship between total Raman pump power and the average Raman gain. There is also a linear relationship between the signal power injected into the far end of the fiber, the signal power coming from the fiber, span fiber loss and the average Raman gain. Therefore, a change in average Raman gain equals change in signal power coming from the fiber. The latter can be measured directly by an optical spectrum analyzer (OSA) or indirectly by devices built into optical transmission equipment.

The Raman effect induces coupling between optical energy at various wavelengths. This includes pump-to-signal, signal-to-signal and pump-to-pump. The propagation of optical energy at various wavelengths in optical fibers can be described theoretically by a system of non-linear differential equations.

It has also been shown that, although solving these equations does not give an accurate measure of absolute Raman gain in a real network, it does provide an accurate representation of the effects of relative changes in individual pump powers on the shape of the Raman gain curve for a specific average Raman gain. For each average gain the look-up table can therefore be filled with the required normalized pump powers (pump power ratios) in order to have a uniform Raman gain for each wavelength for the given average Raman gain. Normalized pump powers remain constant over a region of average Raman gains and therefore high resolution in look-up table is not required.

BRIEF DESCRIPTION OF THE DRAWINGS

Further features and advantages of the present invention will become apparent from the following detailed description, taken in combination with the appended drawings, in which.

It will be noted that, throughout the appended drawings, like features are identified by like reference numerals.

DETAILED DESCRIPTION OF THE PREFERRED EMBODIMENT

Figure 1:
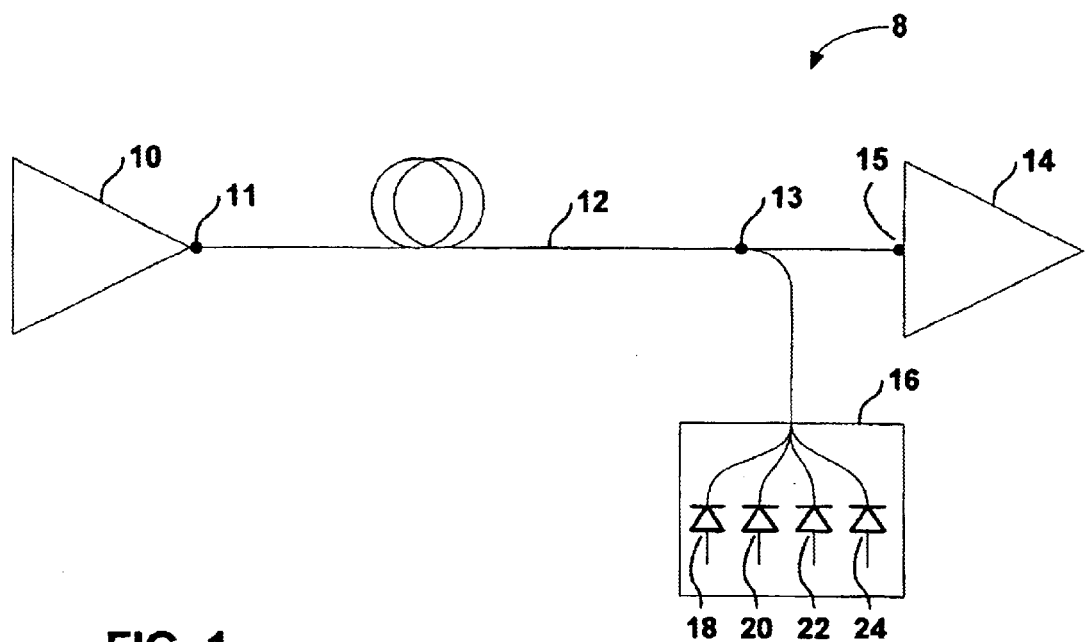
FIG. 1 is a block diagram schematically illustrating principal elements of an exemplary optical transmission system in which the present invention may be deployed.

FIG. 1 is a block diagram schematically illustrating principal elements of an exemplary optical transmission system 8 in which the present invention may be deployed.

For purposes of description of the present invention, the optical transmission system 8 is illustrated as including a single fiber span 12 connecting a pair of optical amplifiers 10 and 14. It should be understood that the present invention is not limited to such an embodiment. Similarly, the optical amplifiers 10 or 14 could be replaced by any discrete optical or electro-optical network component (such as, for example, optical amplifiers, routers, add-drop multiplexers, etc) known in the art.

Optical amplifier 10 introduces optical signals at a plurality of signal wavelengths into the fiber span 12 at a far end 11 of the fiber span 12. The data signals are received at a near end 15 of the optical fiber span 12 at the input to optical amplifier 14. A backward Raman amplifier 16, having a plurality of pump lasers 18, 20, 22 and 24, pumps optical power into the fiber span 12 at a junction 13, proximal to the near end 15. The Raman pump energy is fed in a reverse direction to that of the data signals.

Figure 2:
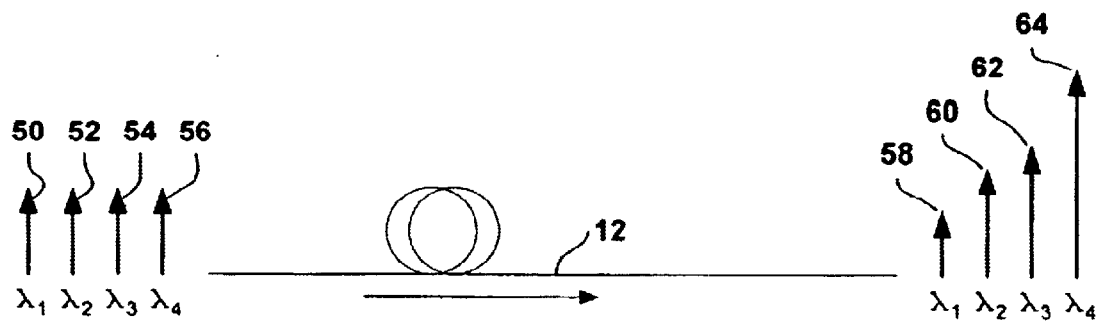
FIG. 2 is an exemplary illustration of the effect of stimulated Raman scattering phenomenon on a group of optical signals in an optical fiber.

FIG. 2 illustrates the effect of stimulated Raman scattering on optical signals traveling in an optical fiber 12 where 50, 52, 54 and 56 represent optical energy at wavelengths $\lambda_1$, $\lambda_2$, $\lambda_3$, $\lambda_4$, where $\lambda_1$ is a shorter wavelength than $\lambda_2$ which is a shorter wavelength than $\lambda_3$ which is a shorter wavelength than $\lambda_4$. Raman scattering causes optical energy transfer from shorter wavelength signals to longer wavelength signals. Energy is transferred from signal 50 to 52, 54 and 56. Energy is transferred from signal 52 to 54 and 56 and energy is transferred from signal 54 to 56. The result is that, at the end of the fiber, shorter wavelength signals have less energy (58) and longer wavelength signals (60, 62, 64) have more energy.

Figure 3:
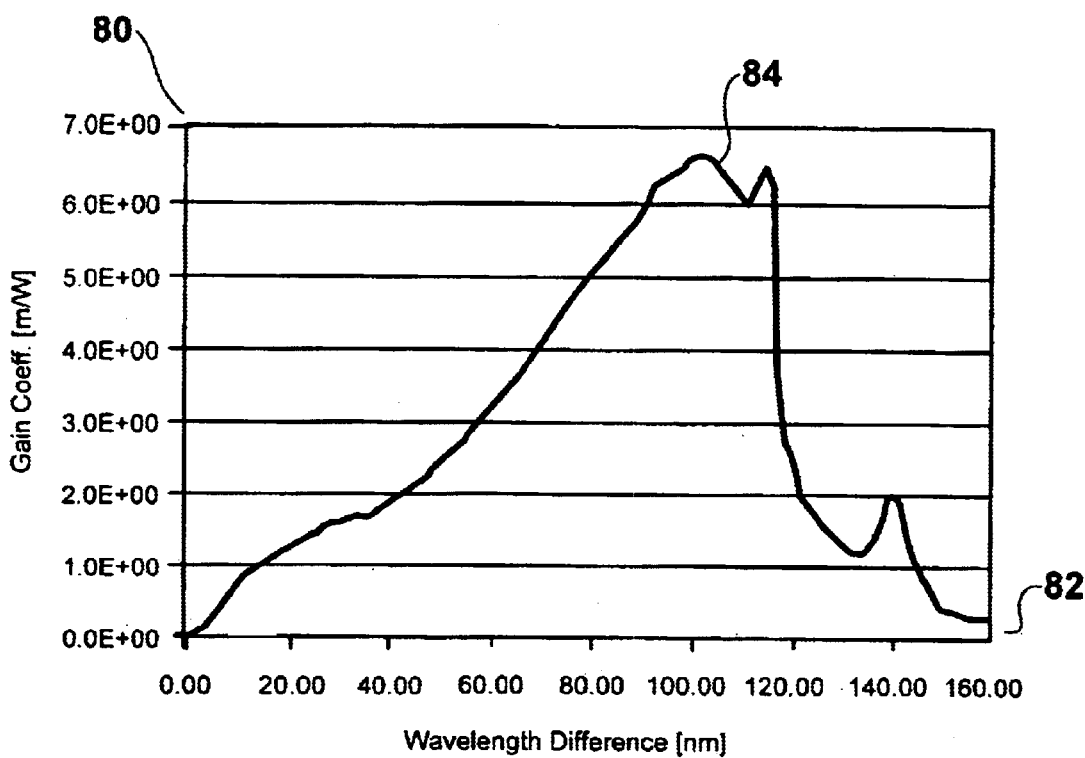
FIG. 3 is a graph showing an exemplary Raman gain curve for an optical fiber illustrating signal gain due to Raman coupling as a function of wavelength offset.

The Raman scattering effect varies with wavelength offset. FIG. 3 illustrates an exemplary Raman curve 84 for any two optical signals in a specific optical medium (for example, an optical fiber). The horizontal axis 82 represents the difference in wavelength between two optical signals and the vertical axis 80 represents the Raman gain co-efficient or the coupling between the two signals. In this example, the Raman effect causes a maximum energy transfer from one signal at a specific wavelength to another signal at a wavelength about 100 nm longer.

In real optical networks, two to four Raman pumps are normally used to boost the signal strength of 40 to 80 signal wavelengths. Depending on the wavelength of the respective signal wavelengths, quite varied interactions are produced. These interactions can be described by a non-linear system of differential equations. For a backward Raman amplifier, the propagation of optical energy at various wavelengths in optical fibers is described by the following two propagation equations:

Forward signal channels:

$$\frac{dP_{si}}{dz} = -\alpha_{si} P_{si} + \sum_{p=1}^{N_p} C_{p,si} P_p P_{si} + \sum_{j=1}^{i-1} C_{si,sj} P_{sj} P_{si} - \sum_{j=i+1}^{N_s} C_{si,sj}\left(\frac{\lambda_{sj}}{\lambda_{si}}\right) P_{sj} P_{si} \quad (1)$$

where z=fiber length, $P_{si}$=signal power for signal i, $\alpha_{si}$= attenuation co-efficient of the fiber at wavelength of signal i, $C_{p,si}$=Raman coupling co-efficient between pump p and signal i, $P_p$=Raman pump power for laser p, $C_{si,sj}$=Raman coupling co-efficient between signal i and signal j, $P_{sj}$=signal power for signal j, $\alpha_{si}$=wavelength of signal i, $\lambda_{sj}$= wavelength of signal j, $N_p$=number of pump lasers and $N_s$=number of signal channels.

Backward pump channels:

$$\frac{dP_{pi}}{dz} = \alpha_{pi}P_{pi} + \sum_{s=1}^{N_s} C_{pi,s}\left(\frac{\lambda_s}{\lambda_{pi}}\right)P_s P_{pi} - \sum_{j=1}^{i-1} C_{pi,pj}P_{pj}P_{pi} + \sum_{j=i+1}^{N_p} C_{pi,pj}\left(\frac{\lambda_{pj}}{\lambda_{pi}}\right)P_{pj}P_{pi} \quad (2)$$

where z=fiber length, $P_{pi}$=Raman pump power for laser i, $\alpha_{pi}$=attenuation co-efficient of the fiber at wavelength of Raman pump i, $C_{pi,s}$=Raman coupling co-efficient between pump i and signal s, $C_{pi,pj}$=Raman coupling co-efficient between pump i and pump j, $P_s$=signal power for signal s, $\lambda_s$=wavelength of signal s, $\lambda_{pi}$=wavelength of pump i, $\lambda_{pj}$=wavelength of pump j, $N_s$=number of signal channels and $N_p$=number of pump lasers.

The Raman coupling co-efficient can be determined from the Raman gain curve (similar to FIG. 3) specific to a type of optical fiber used.

The present invention uses a combination of theoretical calculations and empirical measurements to provide a method for controlling a backward Raman amplifier in an optical communications network. The non-linear differential equations are used to pre-compute a look-up table that relates desired average Raman gain to relative Raman pump powers required to produce a uniform Raman gain across a plurality of signal wavelengths. Empirical measurements are used to determine the total Raman pump power required to obtain the desired average Raman gain.

The look-up table is filled using equations (1) and (2). These differential equations are solved using numerical methods that are well known in the art. The values of $P_{si}$ and $P_{sj}$ are known, and represent the power of the signals injected into the far end 11 of the fiber 12 by amplifier 10. These values are often standardized in modern optical communication systems. The attenuation co-efficient $\alpha_{si}$ of the fiber at wavelength of signal i is also known from specifications provided by the fiber manufacturer. The Raman coupling co-efficients for each combination of two signals, $C_{p,si}$, $C_{si,sj}$, $C_{pi,s}$ and $C_{pi,pj}$, can be derived from the Raman gain curve (similar to FIG. 3) specific to the type of optical fiber used. The wavelength of each signal $\lambda_{si}$, $\lambda_{sj}$, $\lambda_{pi}$ and $\lambda_{pj}$ is given. The number of signal channels $N_s$ is given, as is the number of pump lasers $N_p$. The equations are solved for different values of individual Raman pump powers. The signal powers at the near end of the fiber are then calculated using a nominal fiber length z (100 km, for example) to approximate a typical installation.

Figure 4:
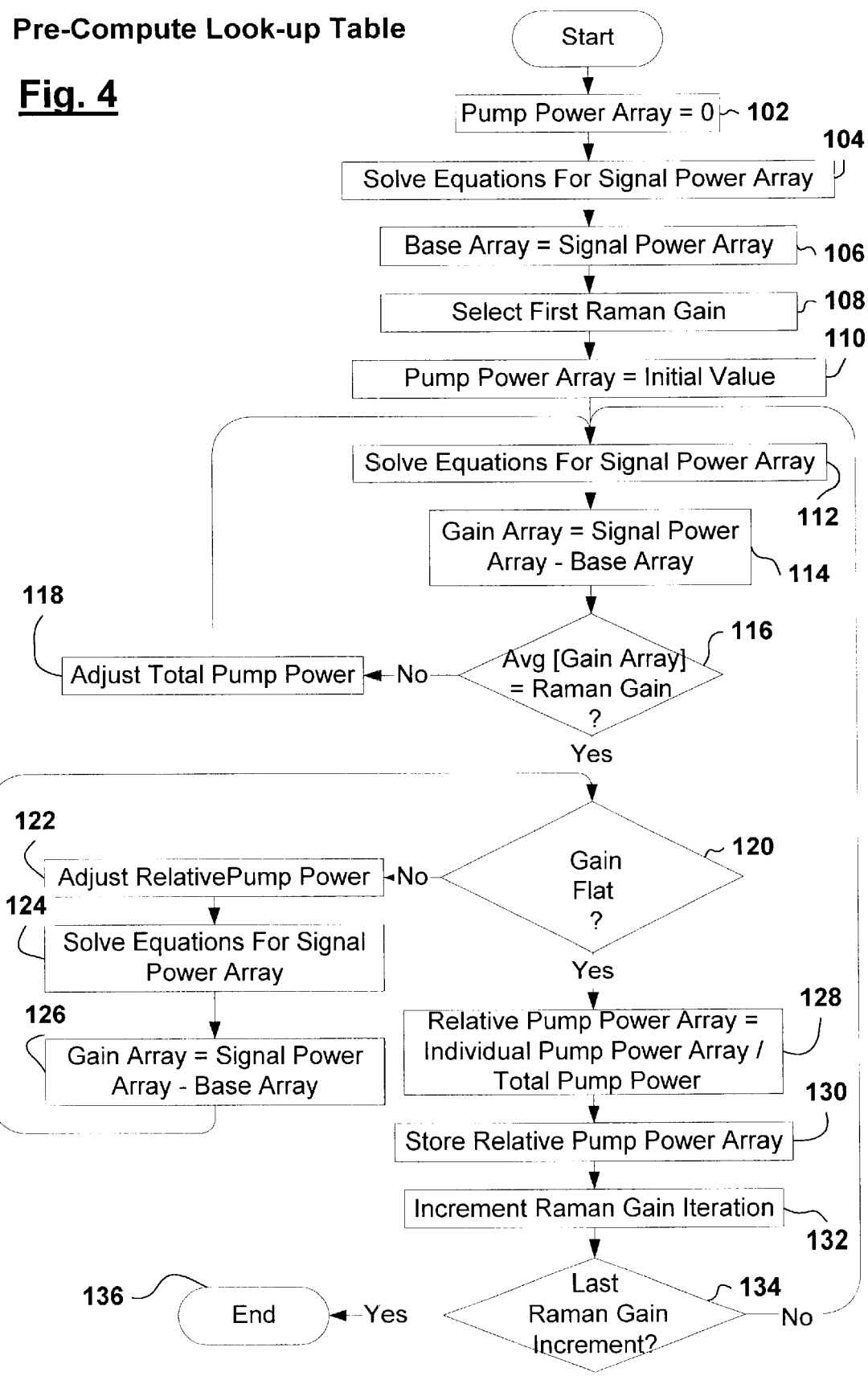
FIG. 4 is a flowchart of an exemplary embodiment of a process for pre-computing a look-up table that provides normalized power values for each of a plurality of average Raman gain values to produce a uniform gain over a range of optical channels.

The table filling process will be described with reference to FIG. 4. The process starts by setting the respective Raman pump powers (pump power array) to zero (step 102), and the equations are solved at step 104 to determine a base array of unamplified signal power values at each signal wavelength (step 106). The look-up table is built for a series of desired Raman gain values, for example 0 dB to 10 dB in 1 or 2 dB increments.

A first desired Raman gain is selected (step 108). The respective Raman pump powers (pump power array) are initialized to a nominal value, 100 milliwatts, for example, (step 110) for a first iteration. The equations are solved for signal powers (signal power array) at step 112. The gain is then calculated by subtracting the base array from the signal power array to determine a gain at each signal wavelength (step 114). An average of the gain values is calculated and compared (step 116) to the desired gain selected in step 108. If the average gain is not the same as the desired gain, the total pump power is increased or decreased as appropriate (step 118) prior to a next iteration. In adjusting the total pump power step 118, the individual pump powers are conveniently incremented or decremented by the same amount. This process is repeated until the calculations produce the desired average gain.

At this point, a second, nested iterative process begins. Once the calculations indicate the desired Raman gain, then at step 120 the gain array is analyzed to determine if the gain is sufficiently uniform across the range of signal wavelengths. For example, it is desirable to achieve a gain at each signal wavelength that varies less than 1 dB with respect to the gain at the other signal wavelengths. If the gain profile is not sufficiently uniform, the individual pump powers are adjusted relative to each other while maintaining the same total Raman power determined in step 116, to improve the gain uniformity (step 122). Since each Raman pump operates at a different wavelength, its associated Raman curve will peak at a different wavelength. The curve can therefore be used as a guide to determine how to adjust the relative pump powers for a next iteration without changing total pump power. The equations are solved again with new values for the individual pump powers (step 124). This process is repeated until the gain is acceptably uniform. Mentioning that each pump laser provides gain for slightly different region of signal wavelengths.

The relative pump powers thus obtained are then normalized by dividing (step 128) the respective pump powers by the total pump power set in the last iteration of step 118. These normalized power values are then stored in the look-up table (step 130).

The next desired Raman gain is selected and the next initial pump power values are chosen (step 132). If it is determined that there are no more desired Raman gain entries (at step 134), the look-up table is complete and the pre-computation process stops (step 136). Otherwise, the process loops back to step 112 to iteratively determine the total pump power and then the relative pump powers required to achieve the selected desired gain with a signal gain variation that is within an acceptable tolerance. These steps are repeated for each additional desired Raman gain until the look-up table is completely filled.

Figure 5:
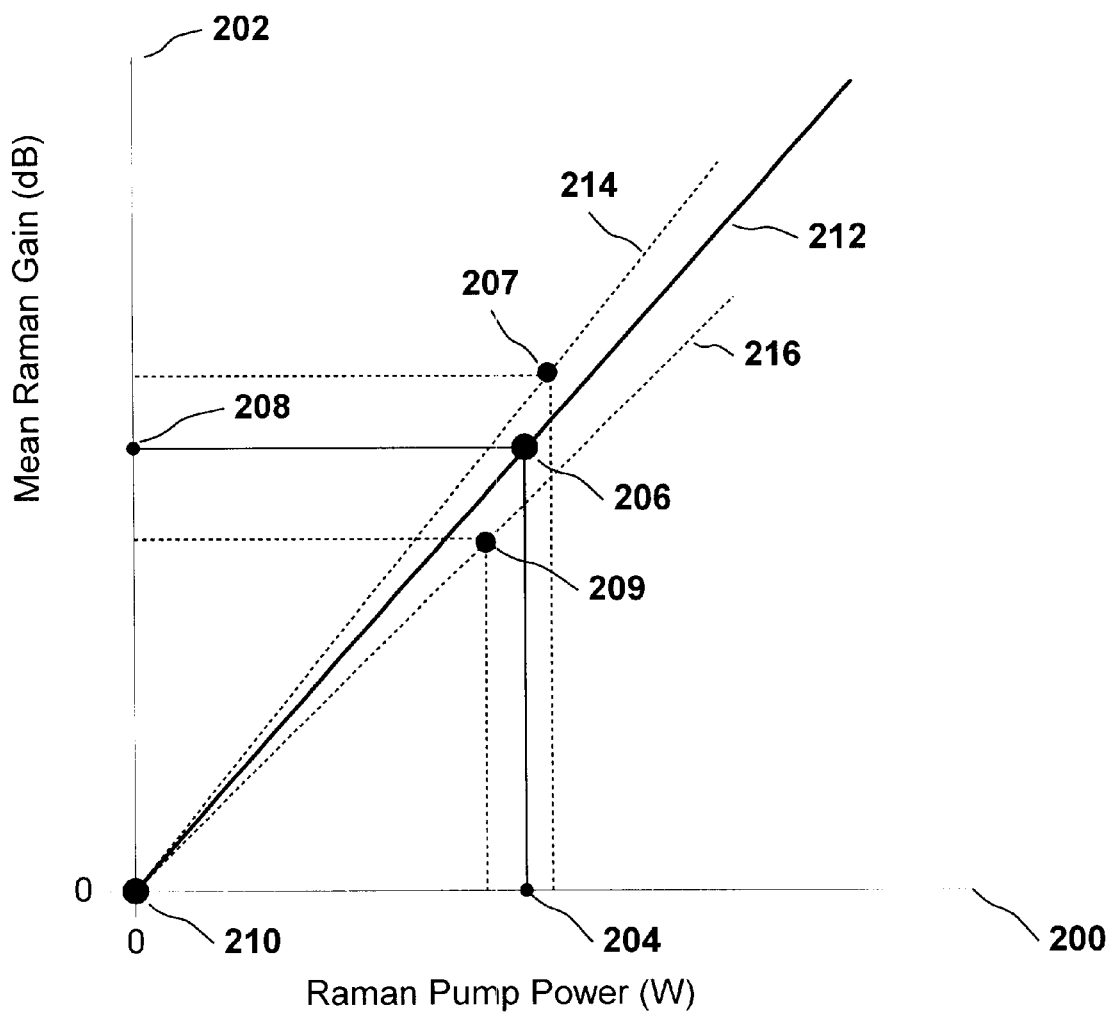
FIG. 5 is an exemplary graph illustrating an empirically derived linear relationship between total Raman pump power and mean Raman gain.

The method of the invention uses the look-up table in conjunction with empirically derived values to accurately control a Raman amplifier, as will be described below with reference to FIGS. 5 and 6.

During the installation of an optical link after a backward Raman amplifier is installed (or after any of the elements in the fiber connection are changed, such as the fiber span, Raman amplifier, the transmitting optical amplifier, etc.), a first signal power measurement is taken with the Raman amplifier off (Raman pump power=0). This defines point 210 on a graph shown in FIG. 5, since no Raman gain is promoted by the Raman amplifier when there is no Raman pump power applied. A second signal power measurement is taken with the Raman amplifier set to a predetermined total Raman pump power (point 204) (usually a typical or normal operating level). The difference between the first signal power measurement and the second represents an average Raman gain (point 208). It has been determined that there is a substantially linear relationship between a total Raman pump power (in watts) and an average Raman gain (in dB). This information can then be plotted as point 206, shown in FIG. 5. A straight line 212 on the graph, shown in FIG. 5, can then be drawn between point 210 and point 206, representing the linear relationship between the total Raman pump power and the average Raman gain.

Measurement accuracy may be improved by adjusting the Raman power slightly and measuring the resulting gain to produce other points 207, 209, for example. The slopes of the resulting lines 212, 214, 216, if different, are averaged to produce a potentially more accurate slope measurement.

The method of the present invention provides information to enable accurate control of a backward Raman amplifier. A desired Raman gain is usually selected based on operational requirements. From the linear relationship calculated in the measuring process illustrated in FIG. 5, a total Raman pump power required to achieve the desired Raman gain is determined. An average Raman gain closest in value to the desired Raman gain is used as a key to a look-up table 32. Table values (normalized power values) are selected that are associated with the average Raman gain. Each normalized power value is then multiplied by the total Raman pump power to obtain the required respective Raman pump power settings.

Figure 6:
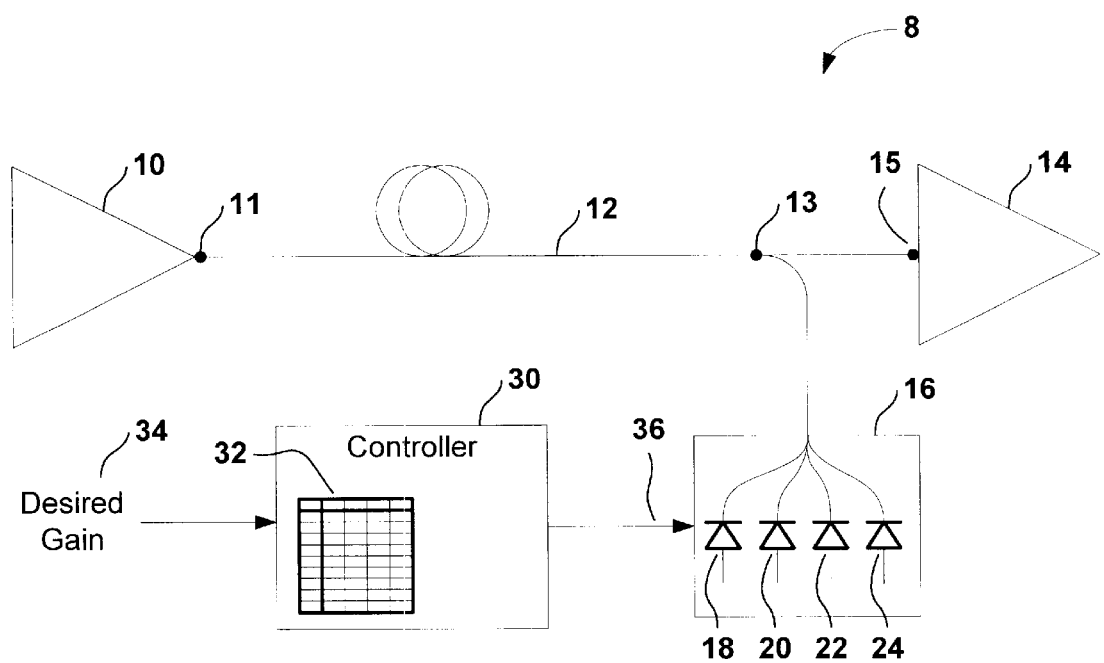
FIG. 6 is a block diagram schematically illustrating principal elements of an exemplary optical transmission system including a controller of the present invention for controlling a backward Raman amplifier.

FIG. 6 illustrates the optical transmission system shown in FIG. 1 with a controller 30 for controlling the individual pumps 18, 20, 22 and 24 of the Raman amplifier 16. The controller 30 stores a look-up table 32 containing calculated values for normalized power values required to achieve a uniform gain across a range of wavelengths for each of a plurality of Raman gain values. The controller also stores a mathematical ratio used to derive total Raman pump power from a slope of the line 212 (FIG. 5). The controller accepts through an interface 34, a desired average gain value. The desired gain value is used by the controller 30 to retrieve normalized power values from the table 32. The normalized power values are used in conjunction with the ratio for deriving total pump power, to compute actual pump power increments to be applied to the respective Raman pumps 18–24. The controller outputs, through an interface 36, power control values for the respective Raman pumps, 18, 20, 22 and 24.

The embodiments of the invention described above are intended to be exemplary only. The scope of the invention is therefore intended to be limited solely by the scope of the appended claims.

We claim:

1. A method for determining a power setting for each of a plurality of Raman pumps of a Raman amplifier used to enhance signal propagation in a given fiber medium, the method comprising steps of:

solving a non-linear system of fiber propagation equations having a general form comprising:

$$\frac{dP_{si}}{dz} = -\alpha_{si}P_{si} + \sum_{p=1}^{N_p} C_{p,si} P_p P_{si} + \sum_{j=1}^{i-1} C_{si,sj} P_{sj} P_{si} - \sum_{j=i+1}^{N_s} C_{si,sj}\left(\frac{\lambda_{sj}}{\lambda_{si}}\right) P_{sj} P_{si} \quad (1)$$

where z=fiber length, $P_{si}$=signal power for signal i, $\alpha_{si}$=attenuation co-efficient of the fiber at wavelength of signal i, $C_{p,si}$=Raman coupling co-efficient between pump p and signal i, $P_p$=Raman pump power for laser p, $C_{si,sj}$=Raman coupling co-efficient between signal i and signal j, $P_{sj}$=signal power for signal j, $\lambda_{si}$=wavelength of signal i, $\lambda_{sj}$=wavelength of signal j, $N_p$=number of pump lasers and $N_s$=number of signal channels; and $$\frac{dP_{pi}}{dz} = \alpha_{pi}P_{pi} + \sum_{s=1}^{N_s} C_{pi,s}\left(\frac{\lambda_s}{\lambda_{pi}}\right) P_s P_{pi} - \sum_{j=1}^{i-1} C_{pi,pj} P_{pj} P_{pi} + \sum_{j=i+1}^{N_p} C_{pi,pj}\left(\frac{\lambda_{pj}}{\lambda_{pi}}\right) P_{pj} P_{pi} \quad (2)$$

where z=fiber length, $P_{pi}$=Raman pump power for laser i, $\alpha_{pi}$=attenuation co-efficient of the fiber at wavelength of Raman pump i, $C_{pi,s}$=Raman coupling co-efficient between pump i and signal s, $C_{pi,pj}$=Raman coupling co-efficient between pump i and pump j, $P_s$=signal power for signal s, $\lambda_s$=wavelength of signal s, $\lambda_{pi}$=wavelength of pump i, $\lambda_{pj}$=wavelength of pump j, $N_s$=number of signal channels and $N_p$=number of pump lasers;

to pre-compute table values for a look-up table, the table values representing, for each of a plurality of average Raman gain values, a corresponding normalized power value for each Raman pump required to provide substantially uniform gain across a plurality of signal wavelengths;

determining a linear relationship between a total Raman pump power and an average Raman gain in the given fiber medium;

determining a required total Raman pump power to achieve a desired average Raman gain using the linear relationship;

looking up a normalized power value in the look-up table corresponding to the desired average Raman gain for each Raman pump; and multiplying the normalized power value for each Raman pump by the required total Raman pump power to determine the power setting for the respective Raman pump.

2. A method as claimed in claim 1, wherein the step of solving predetermined fiber propagation equations to pre-compute table values comprises steps of:

solving the equations once with Raman pump power set to zero; and for each of the desired average signal gain values:
solving the equations iteratively to determine theoretical total Raman pump power required to achieve the desired average signal gain;
solving the equations iteratively to determine relative Raman pump powers to achieve substantially uniform signal gain across the plurality of signal wavelengths; and
normalizing the relative individual Raman pump powers to determine normalized power values.

3. A method as claimed in claim 1, wherein the step of determining a linear relationship comprises steps of:

empirically measuring a first total signal power with the Raman amplifier off;

empirically measuring a second total signal power at a predetermined total Raman pump power;

calculating average Raman gain at the predetermined total Raman pump power by subtracting the first total signal power from the second total signal power; and calculating a linear relationship between average Raman gain and total Raman pump power, assuming that average Raman gain is zero when the Raman amplifier is off.

4. A method as claimed in claim 1, wherein the step of determining a linear relationship comprises steps of:

empirically measuring a first total signal power with the Raman amplifier off;

empirically measuring a plurality of total signal powers each at a respective predetermined total Raman pump power;

calculating average Raman gain at each of the predetermined total Raman pump powers by subtracting the first total signal power from each of the plurality of total signal powers;

calculating a plurality of linear relationships between average Raman gain and total Raman pump power for each of the predetermined total Raman pump powers, assuming that average Raman gain is zero when the Raman amplifier is off; and calculating an average linear relationship between average Raman gain and total Raman pump power from the plurality of linear relationships.

5. A controller for controlling a Raman amplifier having a plurality of Raman pumps, the controller comprising:

a control algorithm for controlling power levels of the Raman pumps to achieve a desired average Raman gain using a a lookup table that is pre-computed by solving predetermined fiber optic equations, having a general form comprising:

$$\frac{dP_{si}}{dz} = \quad (1)$$

$$-\alpha_{si}P_{si} + \sum_{p=1}^{N_p} C_{p,si}P_pP_{si} + \sum_{j=1}^{i-1} C_{si,sj}P_{sj}P_{si} - \sum_{j=i+1}^{N_s} C_{si,sj}\left(\frac{\lambda_{sj}}{\lambda_{si}}\right)P_{sj}P_{si}$$

where z=fiber length, $P_{si}$=signal power for signal 1, $\alpha_{si}$=attenuation co-efficient of the fiber at wavelength of signal i, $C_{p,si}$=Raman coupling co-efficient between pump p and signal i, $P_p$=Raman pump power for laser p, $C_{si,sj}$=Raman coupling co-efficient between signal i and signal j, $P_{sj}$=signal power for signal j, $\lambda_{si}$=wavelength of signal i, $\lambda_{sj}$=wavelength of signal j, $N_p$=number of pump lasers and $N_s$=number of signal channels; and $$\frac{dP_{pi}}{dz} = \alpha_{pi}P_{pi} + \sum_{s=1}^{N_s} C_{pi,s}\left(\frac{\lambda_s}{\lambda_{pi}}\right)P_sP_{pi} - \quad (2)$$

$$\sum_{j=1}^{i-1} C_{pi,pj}P_{pj}P_{pi} + \sum_{j=i+1}^{N_p} C_{pi,pj}\left(\frac{\lambda_{pj}}{\lambda_{pi}}\right)P_{pj}P_{pi}$$

where z=fiber length, $P_{pi}$=Raman pump power for laser i, $\alpha_{pi}$=attenuation co-efficient of the fiber at wavelength of Raman pump i, $C_{pi,s}$=Raman coupling co-efficient between i and signal s, $C_{pi,pj}$=Raman coupling co-efficient between pump i and pump j, $P_s$=signal power for signal s, $\lambda_s$=wavelength of signal s, $\lambda_{pi}$=wavelength of pump i, $\lambda_{pj}$=wavelength of pump j, $N_s$=number of signal channels and $N_p$=number of pump lasers;

the look-up table storing values representing, for each of a plurality of average Raman gain values, a corresponding normalized power value for each Raman pump required to provide substantially uniform gain across a plurality of signal wavelengths, and a stored mathematical ratio that expresses a linear relationship between total Raman pump power and average Raman gain, the gain control algorithm being adapted to multiply the normalized power value for each Raman pump by the required total Raman pump power to determine the power setting for the respective Raman pump.

6. The controller as claimed in claim 5 wherein the apparatus further comprises an interface for accepting input of the desired Raman gain.

7. The controller as claimed in claim 6 wherein the apparatus further comprises an output interface for outputting power settings for the respective Raman pumps.

8. The apparatus as claimed in claim 5, wherein the look-up table is organized into a plurality of rows and columns, each row representing a desired average signal gain in dB and each column representing a normalized pump power for a one of the plurality of Raman pumps.

9. A Raman amplifier comprising:

a plurality of Raman pumps adapted to respectively output a predetermined range of optical wavelengths;

a controller adapted to control a respective pump power for each of the Raman pumps;

means for accepting a desired average signal gain used by the controller to compute respective pump power values for the Raman pumps;

a memory for storing a look-up table pre-computed by solving predetermined fiber propagation equations, having a general form comprising:

$$\frac{dP_{si}}{dz} = \quad (1)$$

$$-\alpha_{si}P_{si} + \sum_{p=1}^{N_p} C_{p,si}P_pP_{si} + \sum_{j=1}^{i-1} C_{si,sj}P_{sj}P_{si} - \sum_{j=i+1}^{N_s} C_{si,sj}\left(\frac{\lambda_{sj}}{\lambda_{si}}\right)P_{sj}P_{si}$$

where z=fiber length, $P_{si}$=signal power for signal i, $\alpha_{si}$=attenuation co-efficient of the fiber at wavelength of signal i, $C_{p,si}$=Raman coupling co-efficient between pump p and signal i, $P_p$=Raman pump power for laser p, $C_{si,sj}$=Raman coupling co-efficient between signal i and signal j, $P_{sj}$=signal power for signal i, $\lambda_{si}$=wavelength of signal i, $\lambda_{sj}$=wavelength of signal j, $N_p$=number of pump lasers and $N_s$=number of signal channels; and $$\frac{dP_{pi}}{dz} = \alpha_{pi}P_{pi} + \sum_{s=1}^{N_s} C_{pi,s}\left(\frac{\lambda_s}{\lambda_{pi}}\right)P_sP_{pi} - \quad (2)$$

$$\sum_{j=1}^{i-1} C_{pi,pj}P_{pj}P_{pi} + \sum_{j=i+1}^{N_p} C_{pi,pj}\left(\frac{\lambda_{pj}}{\lambda_{pi}}\right)P_{pj}P_{pi}$$

where z=fiber length, $P_{pi}$=Raman pump power for laser i, $\alpha_{pi}$=attenuation co-efficient of the fiber at wavelength of Raman pump i, $C_{pi,s}$=Raman coupling co-efficient between pump i and signal s, $C_{pi,pj}$=Raman coupling co-efficient between pump i and pump j, $P_s$=signal power for signal s, $\lambda_s$=wavelength of signal s, $\lambda_{pi}$=wavelength of pump i, $\lambda_{pj}$=wavelength of pump j, $N_s$=number of signal channels and $N_p$=number of pump lasers;

the look-up table providing for each of a plurality of average Raman gain values, a corresponding normalized pump power value for each Raman pump required to provide substantially uniform gain across a plurality of signal wavelengths; normalized power values for the respective Raman pumps;

a memory for storing an empirically derived ratio of average signal gain to total pump power; and means for computing a power setting for each Raman pump by multiplying the normalized power value for each Raman pump by the required total Raman pump power.

10. The Raman amplifier as claimed in claim 9, wherein the Raman amplifier is a backward Raman amplifier.

11. The Raman amplifier as claimed in claim 9, wherein the memory is adapted to store the look-up table as a plurality of rows and columns, each row representing a desired average signal gain in dB and each column representing a normalized pump power for a one of the plurality of Raman pumps.

* * * * *